US012769456B2

(12) United States Patent
Jang

(10) Patent No.: US 12,769,456 B2
(45) Date of Patent: Oct. 20, 2026

(54) STORAGE DEVICE AND OPERATING METHOD THEREOF

(71) Applicant: SK hynix Inc., Icheon-si (KR)

(72) Inventor: In Jong Jang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/954,184

(22) Filed: Nov. 20, 2024

(65) Prior Publication Data

US 2026/0029927 A1 Jan. 29, 2026

(30) Foreign Application Priority Data

Jul. 26, 2024 (KR) ........................ 10-2024-0099017

(51) Int. Cl.
*G06F 3/06* (2006.01)

(52) U.S. Cl.
CPC .......... *G06F 3/0619* (2013.01); *G06F 3/0632* (2013.01); *G06F 3/0679* (2013.01)

(58) Field of Classification Search
CPC .... G06F 3/0619; G06F 3/0632; G06F 3/0679; G06F 3/0659; G06F 3/0634; G06F 3/0604; G06F 3/0614; G06F 3/0653; G06F 3/0658; G06F 2212/1016; G06F 2212/1032; G01K 1/02
See application file for complete search history.

(56) References Cited

U.S. PATENT DOCUMENTS

| | | | | |
|---|---|---|---|---|
| 9,652,026 | B2 * | 5/2017 | Park | G06F 1/1613 |
| 11,243,586 | B2 | 2/2022 | Berke et al. | |
| 2015/0236592 | A1 * | 8/2015 | Inoue | H02P 29/68 318/445 |
| 2015/0261473 | A1 * | 9/2015 | Matsuyama | G06F 3/0659 711/103 |
| 2015/0301744 | A1 * | 10/2015 | Kim | G06F 3/0659 711/103 |
| 2016/0033976 | A1 * | 2/2016 | Jung | G11C 7/04 700/299 |
| 2019/0267100 | A1 * | 8/2019 | Pan | G11C 16/26 |
| 2020/0073568 | A1 * | 3/2020 | Chaiken | G11C 29/021 |
| 2020/0310508 | A1 * | 10/2020 | Force | G06F 1/305 |
| 2023/0176640 | A1 * | 6/2023 | Kim | G06F 1/266 |
| 2024/0329847 | A1 * | 10/2024 | Adhinarayanan | G06F 3/0613 |
| 2024/0427500 | A1 * | 12/2024 | Ciocchini | G06F 3/0679 |

FOREIGN PATENT DOCUMENTS

KR 10-2019-0069774 A 6/2019

* cited by examiner

*Primary Examiner* — Michael Krofcheck

(57) ABSTRACT

A storage device may search for, upon determining that the storage device has entered a preset target state, target setting parameter values, which are values of one or more setting parameters corresponding to a current temperature, in a setting parameter memory. When the search fails, the storage device may reset values of the setting parameters corresponding to the current temperature, and may set an operating environment of the storage device based on the reset values of the setting parameters.

12 Claims, 8 Drawing Sheets

STORAGE DEVICE AND OPERATING METHOD THEREOF

CROSS-REFERENCE TO RELATED APPLICATION

The present application claims priority under 35 U.S.C. § 119(a) to Korean Patent Application No. 10-2024-0099017 filed in the Korean Intellectual Property Office on Jul. 26, 2024, which is incorporated herein by reference in its entirety.

BACKGROUND

1. Technical Field

Embodiments of the present disclosure relate to a storage device configured to reset values of setting parameters upon entering a target state, and an operating method thereof.

2. Related Art

A storage device stores data in response to a request from an external device such as a computer, a mobile terminal (e.g., a smart phone or tablet), or the like.

A storage device may include a memory for storing data therein and a controller for controlling the memory. The memory may be a volatile memory or a non-volatile memory. The controller may receive a command from an external device (i.e., a host), and execute or control operations to read, write, or erase data in the memory included in the storage device according to the received command.

In order for the storage device to operate with optimal performance, the storage device needs to set the operating environment based on an optimal setting parameter value suited to the current temperature.

However, since an optimal setting parameter value varies for each storage device according to temperature, the storage device cannot specify an optimal setting parameter value as a constant value. In addition, the storage device may lack a sufficient timing margin to search for an optimal setting parameter value.

SUMMARY

Various embodiments of the present disclosure are directed to providing a storage device capable of efficiently determining optimal values of setting parameters corresponding to the current temperature, and an operating method thereof.

In an aspect, a storage device may include: a memory configured to store data; a setting parameter memory configured to store values of one or more setting parameters corresponding to each of a plurality of temperature ranges; and a controller configured to upon determining that the storage device has entered a preset target state, search for target setting parameter values, which are values of the setting parameters corresponding to a current temperature, in the setting parameter memory, and when the search fails, reset values of the setting parameters corresponding to the current temperature and set an operating environment of the storage device based on the reset values of the setting parameters.

In an aspect, a method for operating a storage device including a memory storing data may include: upon determining that the storage device has entered a preset target state, searching for target setting parameter values, which are values of one or more setting parameters corresponding to a current temperature, in a setting parameter memory that stores values of the setting parameters corresponding to each of a plurality of temperature ranges; when the search fails, resetting values of the setting parameters corresponding to the current temperature; and setting an operating environment of the storage device based on the reset values of the setting parameters.

According to the embodiments of the present disclosure, it is possible to efficiently determine optimal values of setting parameters corresponding to the current temperature.

DETAILED DESCRIPTION

Figure 1:
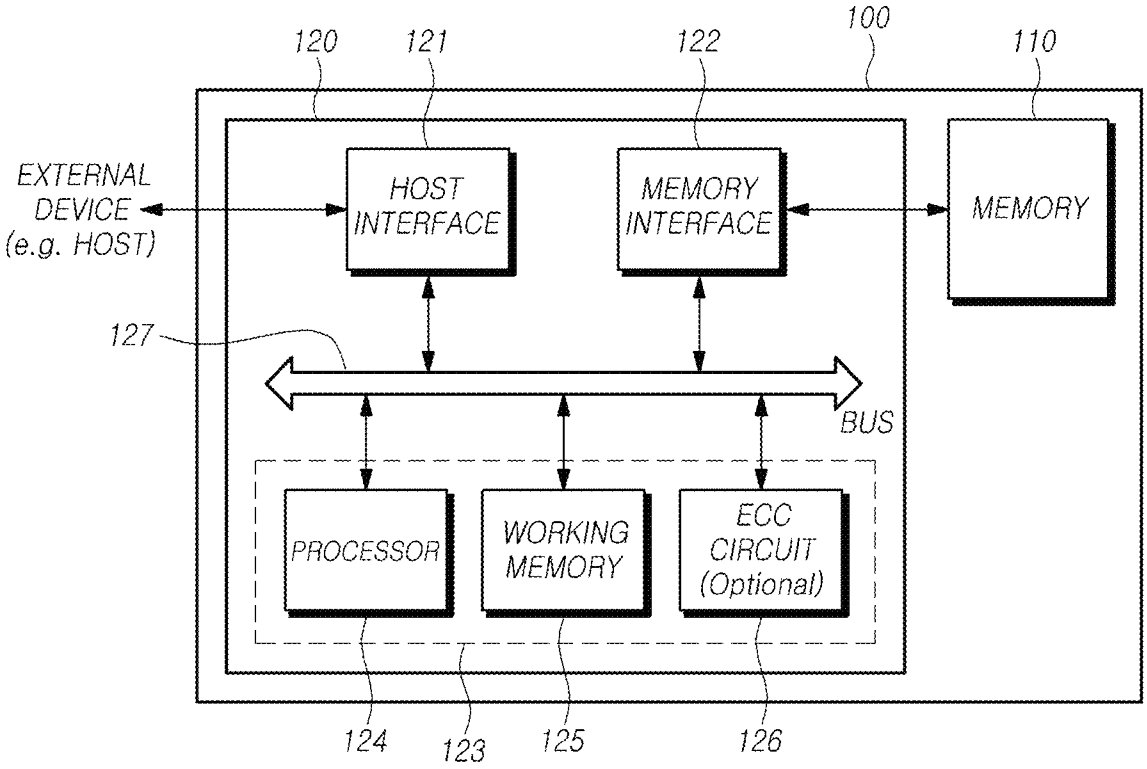
FIG. 1 illustrates a storage device according to an embodiment of the present disclosure.

Hereinafter, embodiments of the present disclosure are described in detail with reference to the accompanying drawings. Throughout the specification, reference to "an embodiment," "another embodiment," or the like is not necessarily to only one embodiment, and different references to any such phrase are not necessarily limited to the same embodiment(s). The term "embodiments" when used herein does not necessarily refer to all embodiments.

Various embodiments of the present disclosure are described below in more detail with reference to the accompanying drawings. However, the present disclosure may be embodied in different forms and variations, and should not be construed as being limited to the embodiments set forth herein. Rather, the described embodiments are provided so that this disclosure will be thorough and complete, and will fully convey the present disclosure to those skilled in the art to which this disclosure pertains. Throughout the disclosure, like reference numerals refer to like parts throughout the various figures and embodiments of the present disclosure.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 illustrates a storage device 100 according to an embodiment of the present disclosure.

Referring to FIG. 1, the storage device 100 may include a memory 110 that stores data and a controller 120 that controls the memory 110.

The memory 110 includes a plurality of memory blocks, and operates under the control of the controller 120. Operations of the memory 110 may include, for example, a read operation, a program operation (also referred to as a write operation), and an erase operation.

The memory 110 may include a memory cell array including a plurality of memory cells (also simply referred to as "cells") that store data.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM), and a spin transfer torque random access memory (STT-RAM).

The memory 110 may be implemented as a three-dimensional array structure. For example, embodiments of the present disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and access an area in the memory cell array that is selected by the address. In other words, the memory 110 may perform an operation indicated by the command, on the area selected by the address.

The memory 110 may perform a program operation, a read operation, or an erase operation. For example, when performing the program operation, the memory 110 may write data to the area selected by the address. During the read operation, the memory 110 may read data from the area selected by the address. In the erase operation, the memory 110 may erase data stored in the area selected by the address.

The controller 120 may control write (or program), read, erase, and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 in response to a request from an external device (e.g., a host). However, the controller 120 may also control the operation of the memory 110 independently of any requests from the host.

The host may be a computer, an ultra-mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any one of various electronic devices that require the storage device 100 capable of storing data.

The host may include at least one operating system (OS). The operating system may generally manage and control the function and operation of the host, and may control interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience in explanation, descriptions will describe the controller 120 and the host as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one from among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol, and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 under the control of the control circuit 123.

The control circuit 123 performs the general control operations of the controller 120 to control the operation of the memory 110. To this end, for instance, the control circuit 123 may include at least one of a processor 124 or a working memory 125, and may optionally include an error detection and correction circuit (ECC circuit) 126.

The processor 124 may control general operations of the controller 120, and may perform a logical calculation. The processor 124 may communicate with the host through the host interface 121, and may communicate with the memory 110 through the memory interface 122.

The processor 124 may execute logical operations required to perform the function of a flash translation layer (FTL). The processor 124 may translate a logical block address (LBA), provided by the host, into a physical block address (PBA) through the flash translation layer. The flash translation layer may receive the logical block address and translate the logical block address into the physical block address, by using a mapping table.

There are various address mapping methods of the flash translation layer, depending on a mapping unit. Representative address mapping methods include a page mapping method, a block mapping method, and a hybrid mapping method.

The processor 124 may randomize data received from the host. For example, the processor 124 may randomize data received from the host by using a set randomizing seed. The randomized data may be provided to the memory 110, and may be written to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logical calculation, the processor 124 may execute (or drive) firmware loaded in the working memory 125 upon booting. Hereafter, an operation of the storage device 100 according to embodiments of the disclosure will be described as implementing the processor 124 that executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer, which performs a translating function between a logical address requested to the storage device 100 from the host and a physical address of the memory 110; a host interface layer (HIL), which serves to analyze a command requested to the storage device 100 as a storage device from the host and transfer the command to the flash translation layer; and a flash interface layer (FIL), which transfers a command, instructed from the flash translation layer, to the memory 110.

For example, such firmware may be loaded in the working memory 125 from the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logical calculation, which is defined in the firmware loaded in the working memory 125, to control the general operation of the controller 120. The processor 124 may store a result of performing the logical calculation defined in the firmware, in the working memory 125. The processor 124 may control the controller 120 according to a result of performing the logical calculation defined in the firmware such that the controller 120 generates a command or a signal. When a part of firmware, in which a logical calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, as data for managing the memory 110, may include management information on user data stored in the memory 110.

Firmware may be updated during the manufacturing process or while the storage device 100 is in operation. The controller 120 may download new firmware from the outside of the storage device 100 and update existing firmware with the new firmware.

To drive the controller 120, the working memory 125 may store necessary firmware, program codes, commands, and data. The working memory 125 may be a volatile memory such as an SRAM (static RAM), a DRAM (dynamic RAM), an SDRAM (synchronous DRAM), or the like. Meanwhile, the controller 120 may additionally use a separate volatile memory (e.g., SRAM, DRAM, or the like) located outside the controller 120 in addition to the working memory 125.

The error detection and correction circuit 126 may detect an error bit of target data, and correct the detected error bit by using an error correction code. The target data may be data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used to implement the error detection and correction circuit 126.

For example, the error detection and correction circuit 126 may detect an error bit by the unit of a set sector in each of the read data, when each read data is constituted by a plurality of sectors. A sector may represent a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate is higher than a reference value, the error detection and correction circuit 126 may determine that a corresponding sector is uncorrectable or has failed. On the other hand, when a bit error rate is lower than the reference value, the error detection and correction circuit 126 may determine that a corresponding sector is correctable or has passed.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data concludes in this manner, the error detection and correction circuit 126 may detect an uncorrectable sector in the last read data. There may be one or more sectors that are determined to be uncorrectable. The error detection and correction circuit 126 may transfer information (e.g., address information) about a sector determined to be uncorrectable to the processor 124.

A bus 127 may be configured to provide channels among the components 121, 122, 124, 125, and 126 of the controller 120. The bus 127 may include a control bus for transferring various control signals, commands, and the like, a data bus for transferring various data, and so forth.

Some components among the above-described components 121, 122, 124, 125, and 126 of the controller 120 may be omitted, or some components among the above-described components 121, 122, 124, 125, and 126 of the controller 120 may be integrated into one component. In addition to the above-described components 121, 122, 124, 125, and 126 of the controller 120, one or more components may be added.

Hereinbelow, the memory 110 will be described in further detail with reference to FIG. 2.

Figure 2:
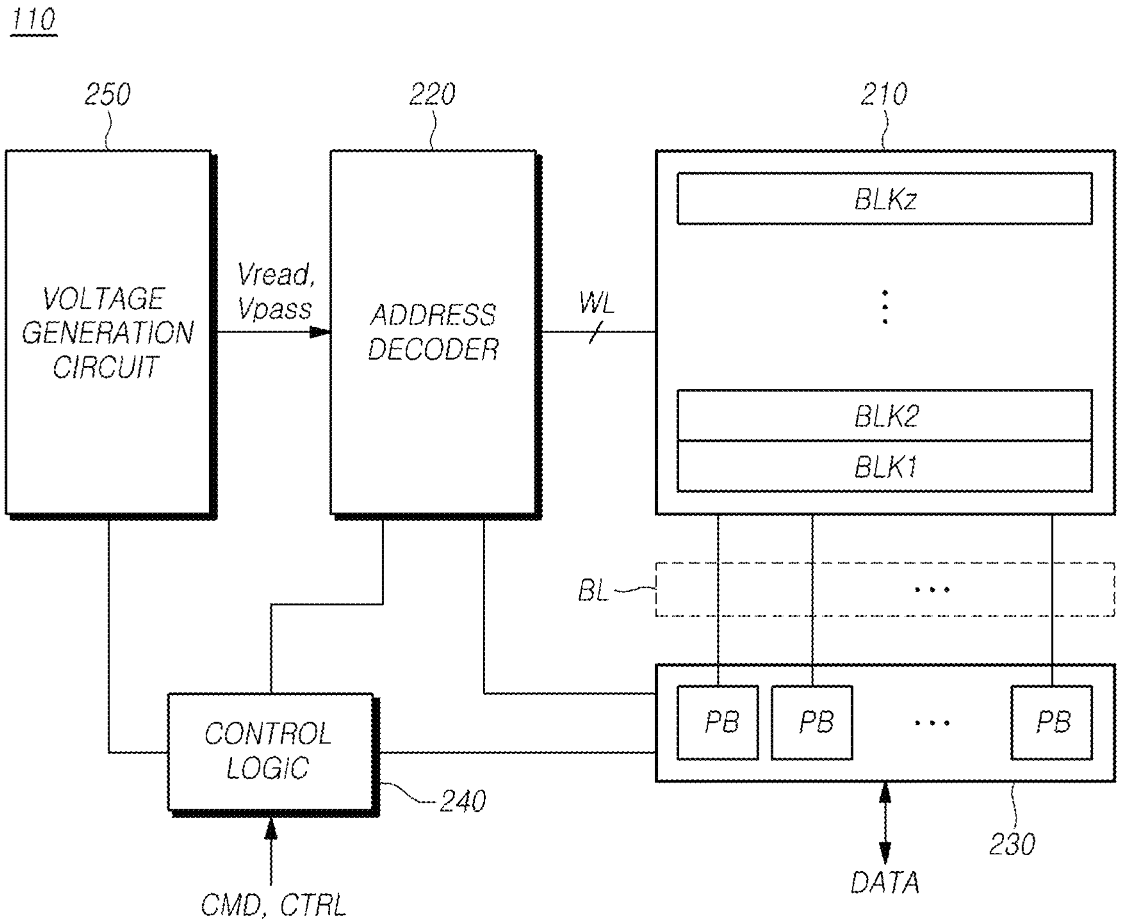
FIG. 2 illustrates a memory of FIG. 1.

FIG. 2 illustrates the memory 110 of FIG. 1.

Referring to FIG. 2, the memory 110 may include a memory cell array 210, an address decoder 220, a read and write circuit 230, a control logic 240, and a voltage generation circuit 250.

The memory cell array 210 may include a plurality of memory blocks BLK1 to BLKz (where z is a natural number equal to or greater than 2).

In the plurality of memory blocks BLK1 to BLKz, a plurality of word lines WL and a plurality of bit lines BL may be disposed, and a plurality of memory cells may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells and configured with vertical channel structures.

The memory cell array 210 may be configured as a two-dimensional or three-dimensional cell array.

Each of the plurality of memory cells included in the memory cell array 210 may store at least 1 bit of data. For instance, each of the plurality of memory cells included in the memory cell array 210 may be a single level cell (SLC) that stores 1 bit of data. In another instance, each of the plurality of memory cells included in the memory cell array 210 may be a multi-level cell (MLC) that stores 2 bits of data. In still another instance, each of the plurality of memory cells included in the memory cell array 210 may be a triple level cell (TLC) that stores 3 bits of data. In yet another instance, each of the plurality of memory cells included in the memory cell array 210 may be a quad level cell (QLC) that stores 4 bits of data. In a further instance, the memory cell array 210 may include a plurality of memory cells, each of which stores 5 or more bits of data.

The number of bits of data stored in each of the plurality of memory cells may be dynamically determined. For example, a single-level cell that stores 1 bit of data may be changed to a triple-level cell that stores 3 bits of data.

Referring to FIG. 2, the address decoder 220, the read and write circuit 230, the control logic 240, and the voltage generation circuit 250 may operate as a peripheral circuit that drives the memory cell array 210.

The address decoder 220 may be coupled to the memory cell array 210 through the plurality of word lines WL.

The address decoder 220 may be configured to operate under the control of the control logic 240.

The address decoder 220 may receive an address through an input/output buffer in the memory 110. The address decoder 220 may be configured to decode a block address from the received address. The address decoder 220 may select at least one memory block based on the decoded block address.

In a read operation, the address decoder 220 may receive a read voltage Vread and a pass voltage Vpass from the voltage generation circuit 250. The address decoder 220 may apply the read voltage Vread to a selected word line WL in a selected memory block, while applying the pass voltage Vpass to the remaining unselected word lines WL.

In a program verify operation, the address decoder 220 may apply a verify voltage generated in the voltage generation circuit 250 to a selected word line WL in a selected memory block, while applying the pass voltage Vpass to the remaining unselected word lines WL.

The address decoder 220 may be configured to decode a column address from the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address, and a column address.

The address decoder 220 may select one memory block and one word line based on a block address and a row address. The address decoder 220 may decode a column address and provide it to the read and write circuit 230.

The address decoder 220 may include at least one from among a block decoder, a row decoder, a column decoder, and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing changes in the current flowing through sensing nodes based on the programmed states of the corresponding memory cells.

The read and write circuit 230 may operate in response to page buffer control signals output from the control logic 240.

In a read operation, the read and write circuit 230 temporarily stores read data by sensing data of memory cells, and then, outputs data DATA to the input/output buffer of the memory 110. As an exemplary embodiment, the read and write circuit 230 may include a column select circuit in addition to the page buffers PB or the page registers.

The control logic 240 may be coupled with the address decoder 220, the read and write circuit 230, and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a control signal output from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. The memory cell may include a transistor.

For example, a transistor in each memory cell may include a drain, a source, and a gate. The drain (or source) of the transistor may be coupled with a corresponding bit line BL either directly or through another transistor. The source (or drain) of the transistor may be coupled with a source line (which may be grounded) either directly or through another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (or write operation) of the memory block described above may be performed by the unit of a page, and an erase operation may be performed by the unit of a memory block.

Figure 3:
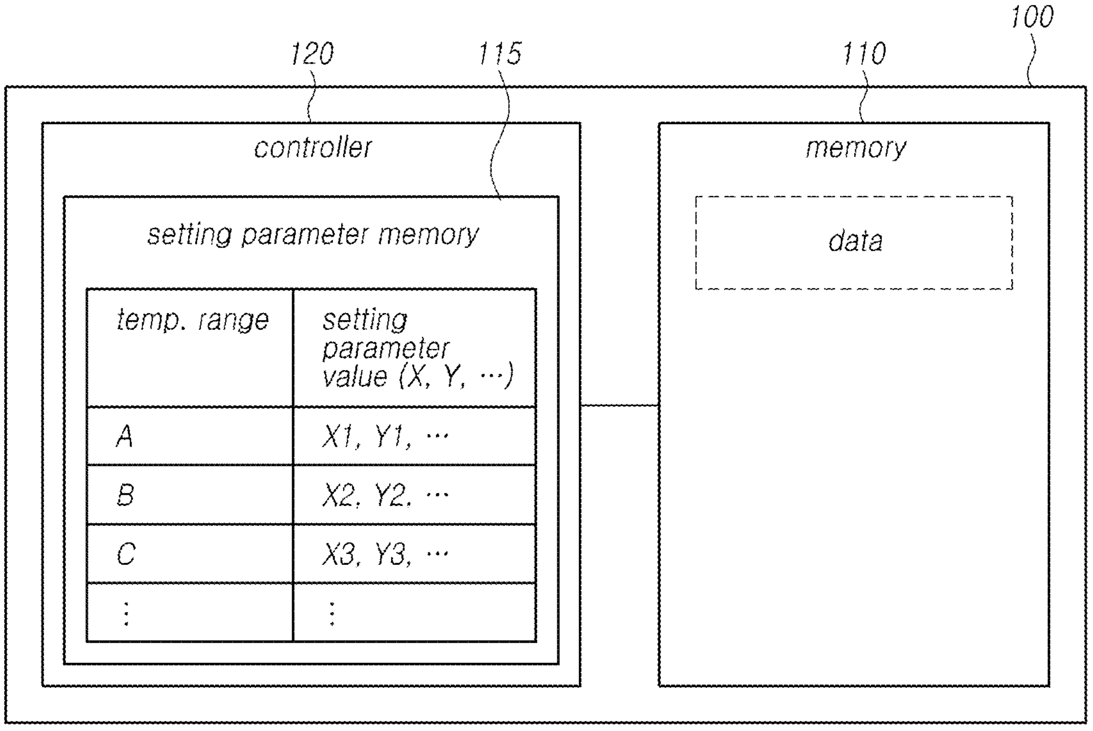
FIG. 3 illustrates a storage device according to an embodiment of the present disclosure.

FIG. 3 illustrates a storage device 100 according to an embodiment of the present disclosure.

Referring to FIG. 3, the storage device 100 may include a memory 110, a setting parameter memory 115 and a controller 120.

The memory 110 may store data. The data stored in the memory 110 may be accessed by the controller 120.

For setting parameters X, Y, . . . , the setting parameter memory 115 may store a value of at least one setting parameter corresponding to each of a plurality of temperature ranges A, B, C, . . . .

For example, the value of at least one setting parameter corresponding to each of the plurality of temperature ranges A, B, C, . . . may be determined during a built-in self-test process.

The plurality of temperature ranges A, B, C, . . . may be determined in various ways.

For example, the plurality of temperature ranges A, B, C, . . . may be determined as a low temperature range, a room temperature range and a high temperature range. The low temperature range may be a temperature range where a temperature is lower than a first temperature value, the room temperature range may be a temperature range where a temperature is equal to or higher than the first temperature value and lower than a second temperature value, and the high temperature range may be a temperature range where a temperature is equal to or higher than the second temperature value.

As another example, each of the plurality of temperature ranges A, B, C, . . . may be a temperature range that has a preset temperature range (e.g., 10° C.).

In FIG. 3, the setting parameter memory 115 may store values of setting parameters X, Y, . . . : setting parameter values X1, Y1, . . . corresponding to the temperature range A, setting parameter values X2, Y2, . . . corresponding to the temperature range B, and setting parameter values X3, Y3, . . . corresponding to the temperature range C.

In the embodiments of the present disclosure, the setting parameters X, Y, . . . may be parameters for setting the operating environment of the storage device 100.

For example, the setting parameters X, Y, . . . may include one or more of the following: the speed of an operating clock, an IOUT setting value for a read operation or a write operation on the memory 110, a phase locked loop (PLL) voltage, correction values for a data signal and a data strobe signal, a low-dropout (LDO) internal voltage, and a threshold voltage for a read operation or a write operation on the memory 110.

The setting parameter memory 115 may be implemented in various ways. For example, the setting parameter memory 115 may be a one-time programmable (OTP) memory. In this case, once an area within the setting parameter memory 115 has been programmed, further write operations are not possible, and only read operations can be performed.

As another example, the setting parameter memory 115 may be a volatile memory (e.g., SRAM or DRAM) or a non-volatile memory (e.g., NAND flash or NOR flash).

In FIG. 3, the setting parameter memory 115 is located inside the controller 120. However, the location of the setting parameter memory 115 is not limited to the inside of the controller 120, and the setting parameter memory 115 may also exist outside the controller 120.

The controller 120 may set the operating environment of the storage device 100.

In the embodiments of the present disclosure, upon determining that the storage device 100 has entered a preset target state, the controller 120 may search the setting parameter memory 115 for target setting parameter values that are values of setting parameters corresponding to the current temperature.

When the controller 120 determines that the search for the target setting parameter values in the setting parameter memory 115 has failed, the controller 120 may reset values of the setting parameters corresponding to the current temperature and set the operating environment of the storage device 100 based on the reset values of the setting parameters.

Through this, the controller 120 can prevent an increase in the probability of error occurrence during the operation of the storage device 100 caused by temperature changes, and can efficiently determine optimal values of setting parameters corresponding to the current temperature.

Hereafter, this will be described in detail with reference to FIG. 4.

Figure 4:
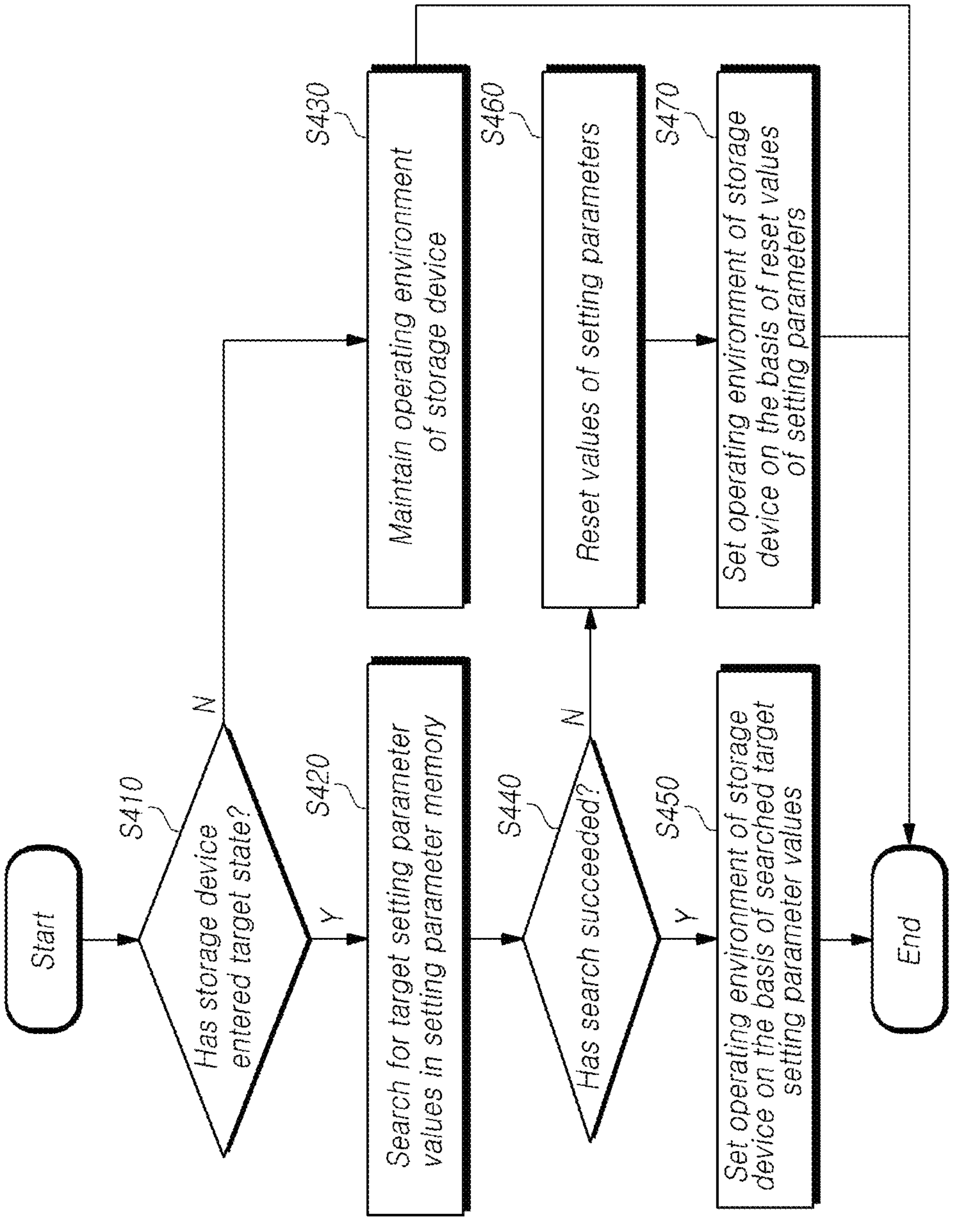
FIG. 4 is a flowchart illustrating an operation of the storage device according to an embodiment of the present disclosure.

FIG. 4 illustrates an operation of the storage device 100 according to an embodiment of the present disclosure.

Referring to FIG. 4, the controller 120 of the storage device 100 determines whether the storage device 100 has entered a target state (S410).

For example, the target state may be a state of waking up from a low power mode (e.g., H8), a state of executing a boot operation, an idle state, a state in which a failure (e.g., a data link (DL) error) has occurred during a read operation or a write operation on the memory 110, or a state in which a command requesting to reset values of the setting parameters is received from a host.

When it is determined that the storage device 100 has entered the target state (S410-Y), the controller 120 may search for target setting parameter values in the setting parameter memory 115 (S420). When the storage device 100 has entered the target state, the controller 120 may determine that there is a sufficient timing margin for setting the operating environment of the storage device 100.

The target setting parameter values are values of setting parameters corresponding to the current temperature. The current temperature may be measured by one or more temperature sensors (not illustrated) included in the storage device 100.

On the other hand, when it is determined that the storage device 100 has not entered the target state (S410-N), the controller 120 may maintain the current operating environment of the storage device 100 (S430). In this case, the controller 120 does not search for target setting parameter values in the setting parameter memory 115.

After completing step S420, the controller 120 determines whether the target setting parameter values have been successfully found in the setting parameter memory 115 (S440).

When the target setting parameter values are successfully found in the setting parameter memory 115 (S440-Y), the controller 120 may set the operating environment of the storage device 100 based on the target setting parameter values (S450).

On the other hand, when the search for the target setting parameter values in the setting parameter memory 115 has failed (S440-N), the controller 120 may reset values of the setting parameters (S460) and set the operating environment of the storage device 100 based on the reset values (S470).

The controller 120 may determine the order for resetting values of the setting parameters based on the priorities of the setting parameters.

For example, among the setting parameters, a setting parameter (e.g., a PLL voltage) that indicates a voltage value may have a higher priority than another setting parameter (e.g., correction values of a data signal and a data strobe signal or an IOUT setting value of a read operation or a write operation) that does not indicate a voltage value.

Hereinbelow, an operation in which the storage device 100 resets, at step S460, a value of a setting parameter that is one of the setting parameters will be described with reference to FIG. 5.

Figure 5:
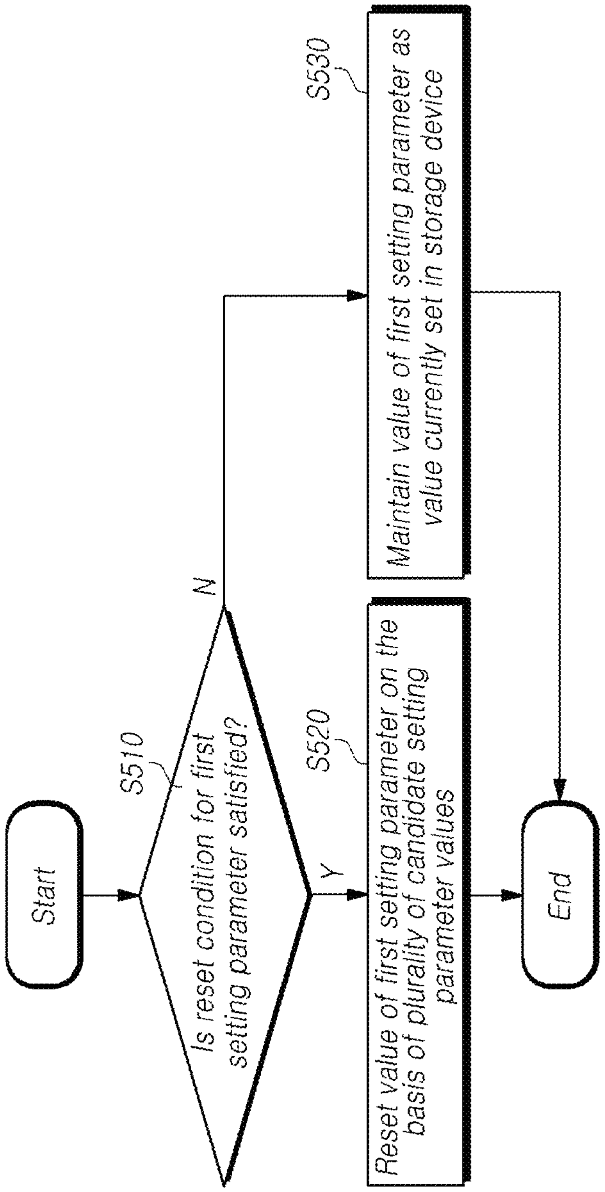
FIG. 5 is a flowchart illustrating an operation in which the storage device resets a value of a setting parameter.

FIG. 5 is a flowchart illustrating an operation in which the storage device 100 resets a value of a the setting parameter.

Referring to FIG. 5, the controller 120 of the storage device 100 determines whether a reset condition for the setting parameter is satisfied (S510). This will be described in detail with reference to FIG. 6.

When it is determined that the reset condition is satisfied (S510-Y), the controller 120 may reset the value of the setting parameter based on a plurality of candidate setting parameter values corresponding to the setting parameter (S520).

On the other hand, when it is determined that the reset condition is not satisfied (S510-N), the controller 120 may maintain the value of the setting parameter that is currently set in the storage device 100 (S530).

Figure 6:
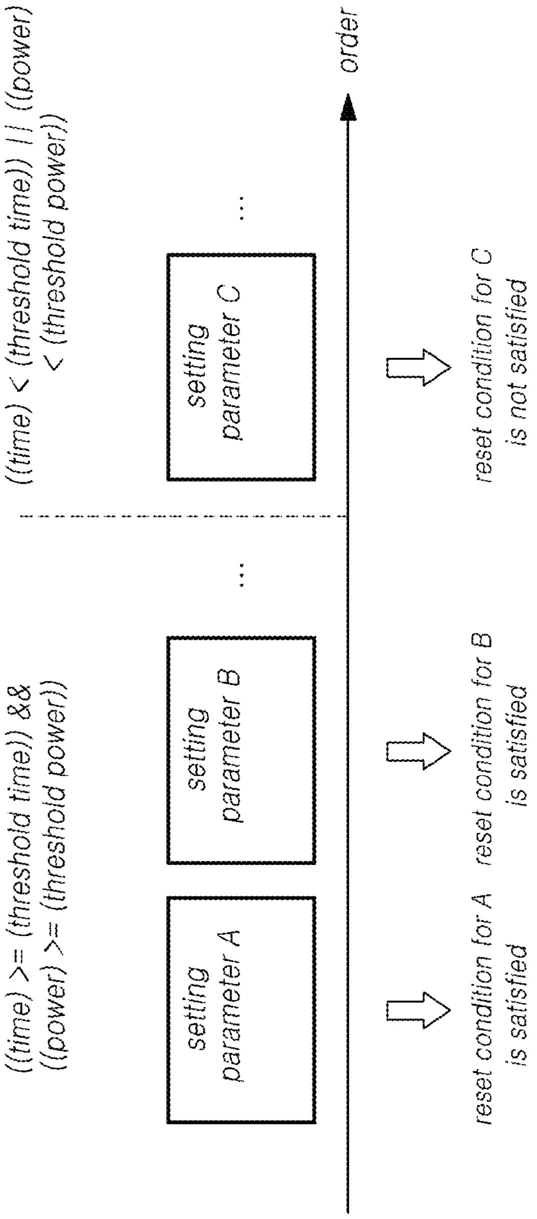
FIG. 6 illustrates an operation in which the storage device determines a reset condition for a setting parameter.

FIG. 6 illustrates an operation in which the storage device 100 determines a reset condition for a setting parameter.

When a current marginal time, which is available for resetting a setting parameter, corresponding to the target state is equal to or greater than a threshold time corresponding to the setting parameter and a current marginal power, which is available for resetting a setting parameter, corresponding to the target state is equal to or greater than a threshold power corresponding to the setting parameter, the controller 120 of the storage device 100 may determine that the reset condition for the setting parameter is satisfied.

In FIG. 6, for setting parameters A and B, a current marginal time corresponding to the target state is equal to or greater than the threshold time and a current marginal power corresponding to the target state is equal to or greater than the threshold power. Therefore, the controller 120 may determine that reset conditions for the setting parameters A and B are satisfied.

On the other hand, for a setting parameter C, a current marginal time corresponding to the target state is shorter than the threshold time, or a current marginal power corresponding to the target state is lower than the threshold power. Therefore, the controller 120 may determine that a reset condition for the setting parameter C is not satisfied.

In this case, the controller 120 performs a resetting operation only for the setting parameters A and B, while maintaining the currently set value for the setting parameter C.

Figure 7:
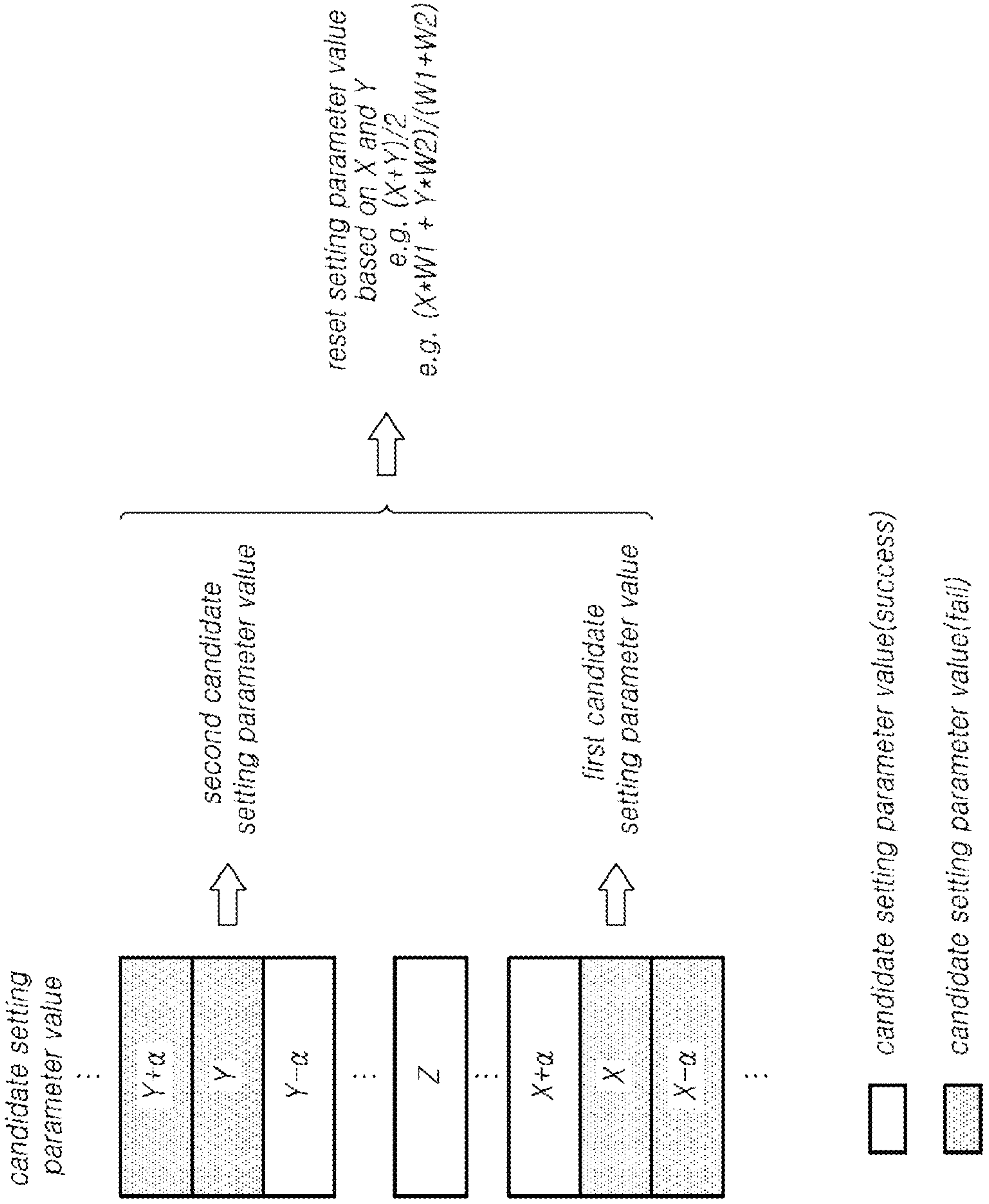
FIG. 7 illustrates an operation in which the storage device of resets a value of a setting parameter based on candidate setting parameter values.

FIG. 7 illustrates an operation in which the storage device 100 resets a value of a setting parameter based on candidate setting parameter values.

Referring to FIG. 7, the controller 120 of the storage device 100 may determine a first candidate setting parameter value X and a second candidate setting parameter value Y from among candidate setting parameter values corresponding to the setting parameter.

The first candidate setting parameter value X and the second candidate setting parameter value Y may be determined in various ways.

For example, the controller 120 may determine the first candidate setting parameter value X and the second candidate setting parameter value Y from among candidate setting parameter values that could cause a failure in at least one of a read operation or a write operation on the memory 110.

In FIG. 7, the first candidate setting parameter value X may be the maximum value among candidate setting parameter values smaller than a preset default candidate setting parameter value Z.

The second candidate setting parameter value Y may be the minimum value among candidate setting parameter values larger than the preset default candidate setting parameter value Z.

The controller 120 may reset the value of the setting parameter based on the first candidate setting parameter value X and the second candidate setting parameter value Y.

For example, the controller 120 may reset the value of the setting parameter to either the average (X+Y)/2 or a weighted average (X*W1+Y*W2)/(W1+W2) of the first candidate setting parameter value X and the second candidate setting parameter value Y. The weights W1 and W2 may be determined as arbitrary values.

Figure 8:
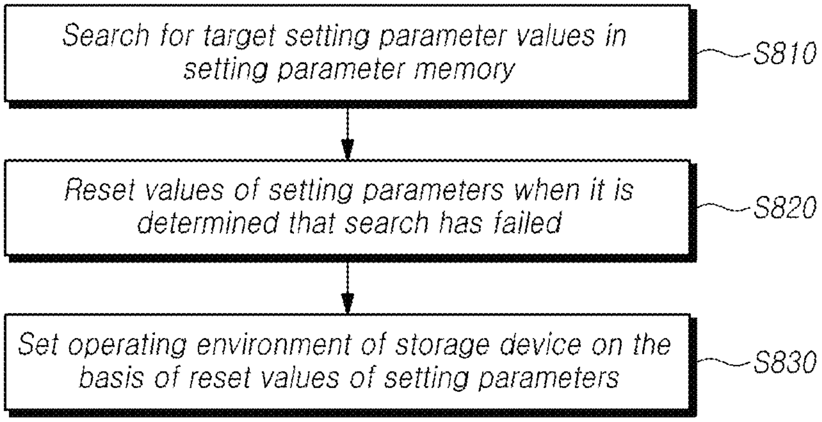
FIG. 8 is a flowchart illustrating a method for operating a storage device according to an embodiment of the present disclosure.

FIG. 8 illustrates a method for operating the storage device 100 according to an embodiment of the present disclosure.

First, the method may include step S810, which involves searching, upon determining that the storage device 100 has entered a preset target state, for target setting parameter values in the setting parameter memory 115. The target setting parameter values are values of one or more setting parameters corresponding to the current temperature.

The setting parameter memory 115 may store values of setting parameters corresponding to each of a plurality of temperature ranges. For example, the setting parameter memory 115 may be a one-time programmable (OTP) memory.

For example, the target state may be a state of waking up from a low power mode, a state of executing a boot operation, an idle state, a state in which a failure has occurred during a read operation or a write operation on the memory 110, or a state in which a command requesting to reset values of the setting parameters is received from a host.

The method may include step S820, which involves resetting values of the setting parameters corresponding to the current temperature when it is determined that the search for the target setting parameter values in the setting parameter memory 115 has failed, i.e., when the target setting parameter values are not found in the setting parameter memory 115.

For example, step S820 may include step of determining a reset condition for a first setting parameter among the setting parameters and step of resetting a value of the first setting parameter based on a plurality of candidate setting parameter values corresponding to the first setting parameter when it is determined that the reset condition for the first setting parameter is satisfied.

When a current marginal time corresponding to the target state is equal to or greater than a threshold time corresponding to the first setting parameter and a current marginal power corresponding to the target state is equal to or greater than a threshold power corresponding to the first setting parameter, the step of determining the reset condition may determine that the reset condition for the first setting parameter is satisfied.

The step of resetting the value of the first setting parameter may include step of determining a first candidate setting parameter value and a second candidate setting parameter value from among the candidate setting parameter values corresponding to the first setting parameter, and step of resetting the value of the first setting parameter based on the first candidate setting parameter value and the second candidate setting parameter value.

The step of determining the first candidate setting parameter value and the second candidate setting parameter value may determine the first candidate setting parameter value and the second candidate setting parameter value from among candidate setting parameter values that could cause a failure in at least one of a read operation or a write operation on the memory 110. The first candidate setting parameter value may be the maximum value among candidate setting parameter values smaller than a preset default candidate setting parameter value, and the second candidate setting parameter value may be the minimum value among candidate setting parameter values larger than the default candidate setting parameter value.

The step of resetting the value of the first setting parameter based on the first candidate setting parameter value and the second candidate setting parameter value may reset the value of the first setting parameter as the average or a weighted average of the first candidate setting parameter value and the second candidate parameter value.

The method for operating the storage device 100 may include step S830, which involves setting the operating environment of the storage device 100 based on reset values of the setting parameters.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A storage device, comprising:

a memory configured to store data;

a setting parameter memory configured to store values of one or more setting parameters corresponding to each of a plurality of temperature ranges; and a controller configured to, upon determining that the storage device has entered a preset target state, search for target setting parameter values, which are values of the setting parameters corresponding to a current temperature, in the setting parameter memory, and, when the search fails, reset values of the setting parameters corresponding to the current temperature and set an operating environment of the storage device based on the reset values of the setting parameters, wherein the controller determines that a reset condition for a first setting parameter among the setting parameters is satisfied, and upon determining that the reset condition for the first setting parameter is satisfied, the controller resets a value of the first setting parameter based on a plurality of candidate setting parameter values corresponding to the first setting parameter, wherein when a current marginal time available for resetting the first setting parameter in the target state is equal to or greater than a threshold time corresponding to the first setting parameter and a current marginal power available for resetting the first setting parameter in the target state is equal to or greater than a threshold power corresponding to the first setting parameter, the controller determines that the reset condition for the first setting parameter is satisfied.

2. The storage device according to claim 1, wherein the setting parameter memory is a one-time programmable (OTP) memory.

3. The storage device according to claim 1, wherein the target state is a state of waking up from a low power mode, a state of executing a boot operation, an idle state, a state in which a failure has occurred during a read operation or a write operation on the memory, or a state in which a command requesting to reset values of the setting parameters is received from a host.

4. The storage device according to claim 1, wherein the controller determines a first candidate setting parameter value and a second candidate setting parameter value from among the plurality of candidate setting parameter values corresponding to the first setting parameter, and the controller resets the value of the first setting parameter based on the first candidate setting parameter value and the second candidate setting parameter value.

5. The storage device according to claim 4, wherein the controller determines the first candidate setting parameter value and the second candidate setting parameter value from among candidate setting parameter values that cause a failure in at least one of a read operation or a write operation on the memory, the first candidate setting parameter value is a maximum value among candidate setting parameter values smaller than a preset default candidate setting parameter value, and the second candidate setting parameter value is a minimum value among candidate setting parameter values larger than the default candidate setting parameter value.

6. The storage device according to claim 4, wherein the controller resets the value of the first setting parameter to an average or a weighted average of the first candidate setting parameter value and the second candidate setting parameter value.

7. A method for operating a storage device including a memory storing data, the method comprising:

determining that the storage device has entered a preset target state;

upon determining that the storage device has entered the preset target state, searching for target setting parameter values, which are values of one or more setting parameters corresponding to a current temperature, in a setting parameter memory that stores values of the setting parameters corresponding to each of a plurality of temperature ranges;

determining that the search has failed;

upon determining that the search has failed, resetting values of the setting parameters corresponding to the current temperature; and setting an operating environment of the storage device based on the reset values of the setting parameters, wherein the resetting values of the setting parameters comprises:

determining that a reset condition for a first setting parameter among the setting parameters is satisfied; and upon determining that the reset condition for the first setting parameter is satisfied, resetting a value of the first setting parameter based on a plurality of candidate setting parameter values corresponding to the first setting parameter, wherein when a current marginal time available for resetting the first setting parameter in the target state is equal to or greater than a threshold time corresponding to the first setting parameter and a current marginal power available for resetting the first setting parameter in the target state is equal to or greater than a threshold power corresponding to the first setting parameter, it is determined that the reset condition for the first setting parameter is satisfied.

8. The method according to claim 7, wherein the setting parameter memory is a one-time programmable (OTP) memory.

9. The method according to claim 7, wherein the target state is a state of waking up from a low power mode, a state of executing a boot operation, an idle state, a state in which a failure has occurred during a read operation or a write operation on the memory, or a state in which a command requesting to reset values of the setting parameters is received from a host.

10. The method according to claim 7, wherein the resetting a value of the first setting parameter based on a plurality of candidate setting parameter values comprises:

determining a first candidate setting parameter value and a second candidate setting parameter value from among the plurality of candidate setting parameter values corresponding to the first setting parameter; and resetting the value of the first setting parameter based on the first candidate setting parameter value and the second candidate setting parameter value.

11. The method according to claim 10, wherein the determining a first candidate setting parameter value and a second candidate setting parameter value comprises determining the first candidate setting parameter value and the second candidate setting parameter value from among candidate setting parameter values that cause a failure in at least one of a read operation or a write operation on the memory, the first candidate setting parameter value is a maximum value among candidate setting parameter values smaller than a preset default candidate setting parameter value, and the second candidate setting parameter value is a minimum value among candidate setting parameter values larger than the default candidate setting parameter value.

12. The method according to claim 10, wherein the resetting a value of the first setting parameter based on the first candidate setting parameter value and the second candidate setting parameter value comprises resetting the value of the first setting parameter to an average or a weighted average of the first candidate setting parameter value and the second candidate setting parameter value.

* * * * *